United States Patent Office 3,523,110
Patented Aug. 4, 1970

3,523,110
PURIFICATION OF 1-OLEFIN RECYCLE
TO POLYMERIZATION
Raymond Eichenbaum, Spotswood, N.J., assignor to Mobil Oil Corporation, a corporation of New York
No Drawing. Filed Dec. 4, 1967, Ser. No. 687,482
Int. Cl. C08f 1/34, 3/12
U.S. Cl. 260—88.2     2 Claims

ABSTRACT OF THE DISCLOSURE

In the continuous stereospecific polymerization and copolymerization of $C_4$–$C_{10}$ 1-olefins in liquid monomer solution, liquid monomer recycle containing impurities that inhibit polymerization is treated with 0.01 to 1.0 weight percent of anhydrous aluminum chloride for 5–40 minutes at 48–93° C., monomer is vaporized and filtered, and recondensed to a purified liquid monomer recycle. The treated recycle will produce up to as much as three times the amount of polymer per catalyst unit as can be produced using untreated recycle.

BACKGROUND OF THE INVENTION

Field of the invention

This invention relates to 1-olefin purification. It is more particularly concerned with purifying a 1-olefin recycle stream in the continuous stereospecific polymerization of $C_4$–$C_{10}$ 1-olefins in liquid monomer solution.

Description of the prior art

It has been proposed to treat olefin mixtures to remove trisubstituted monoolefins, thereby obtaining an olefin mixture useful for making biodegradable detergents. Such treatment involves contacting the olefin mixture with mixtures, such as $SnCl_4$ and HCl (U.S. 3,317,624) and $FeCl_3$ and HCl (U.S. 3,318,969). It has also been proposed to treat olefins with combinations of other Friedel-Crafts catalysts and HCl or activators, e.g. water, that act to form HCl in situ. In the case of stereoregular polymerization using the so-called Ziegler-Natta catalyst systems, however, HCl acts to decrease the activity of the catalyst system. Accordingly, resort must be had to added extraction and washing operations to remove HCl from the treated olefin recycle.

SUMMARY OF THE INVENTION

In accordance with this invention, there is provided, in the continuous process for the liquid phase polymerizing or copolymerizing a $C_4$–$C_{10}$ 1-olefin in contact with a Ziegler-Natta catalyst to form a tactic polymer and using sufficient excess liquid 1-olefin and temperature and pressure conditions to dissolve the polymer in liquid 1-olefin, wherein there is separated a 1-olefin recycle that contains impurities which deactivate a Ziegler-Natta catalyst, the method of treating said recycle to remove said impurities consisting essentially of contacting said recycle in the liquid phase with 0.01 to 1.0 weight percent of $AlCl_3$ for between 5 and 40 minutes at between 48° C. and 93° C. to obtain a treated recycle mixture, vaporizing 1-olefin monomer from said mixture and filtering, and recondensing said 1-olefin monomer as treated recycle 1-olefin.

DESCRIPTION OF SPECIFIC EMBODIMENTS

In copending application Ser. No. 453,599, filed May 6, 1965, now U.S. Pat. No. 3,362,940 a continuation-in-part of application Ser. No. 375,061, filed June 15, 1964, now abandoned there is disclosed and claimed a process for the continuous stereospecific polymerization and copolymerization of $C_4$–$C_{10}$ 1-olefins in solution in liquid 1-olefin monomer. Reference is made to said Ser. No. 453,599 for a detailed description of the process and such description is hereby incorporated herein by reference. In general there is described a continuous process for producing tactic homopolymer or copolymer that comprises continuously introducing into a polymerization zone a liquid 1-olefin main monomer having 4 to 10 carbon atoms, or a liquid 1-olefin main monomer having 4 to 10 carbon atoms admixed with up to 20 mole percent propylene or ethylene, with a catalyst system comprising A, a compound of a transitional metal of Groups IV–A, V–A, VI–A, and VIII of the Periodic Arrangement of the Elements, wherein the metal is in a valence state lower than its maximum and at least one component B, organometallic compound of metals of Groups II and III of the Periodic Arrangement of the Elements. A preferred catalyst system comprises $TiCl_3$ and diethylaluminum chloride. The amount of the 1-olefin used is in excess over the amount of 1-olefin that will react with the catalyst system to form tactic polymer and sufficient to form a solution of the tactic polymer in the liquid 1-olefin main monomer having a concentration not greater than about 30 weight percent tactic polymer. The polymerization is carried out at a temperature between the lower cloud point and the upper cloud point of the solution of tactic polymer in the liquid main monomer and at a pressure sufficient to maintain liquid phase. There is continuously withdrawn from the polymerization zone an effluent comprising a solution of tactic polymer in liquid main monomer. Catalyst is removed and tactic polymer is separated from monomer. Then, the liquid monomer is recycled to the polymerization zone. It is the recycle monomer with which this invention is concerned.

When the recovered recycle monomer is subjected to polymerization as aforedescribed, the amount of tactic polymer produced per unit of catalyst is greatly reduced, due to contaminants in the recycle monomer which tend to reduce catalyst activity. The precise nature of these contaminants is not clearly known but it can be postulated that they may be diolefins, acetylenes, and trisubstituted olefins which are formed in small amounts during the polymerization reaction. In the case of butene-1, the iso-olefin is not a contaminant, because, as is demonstrated hereinafter, as much as 25 mole percent isobutylene can be present in the olefin feed without appreciable effect on catalyst activity.

In accordance with this invention, before returning the liquid recycle monomer to the polymerization zone it is treated with anhydrous $AlCl_3$, monomer is distilled, filtered, and recondensed. The amount of $AlCl_3$ used is between about 0.01 percent and about 1.0 percent, by weight of the recycle monomer being treated. Treatment is readily effected by agitating the liquid recycle monomer with the $AlCl_3$ for between 5 and 40 minutes. The temperature of treatment is between 48° C. and 93° C. At temperatures above and below this range too much of the charge is oligomerized to oil. As is shown hereinafter. The pressure will be sufficient to maintain liquid phase, i.e., between 55 p.s.i.g. and 220 p.s.i.g.

Monomer is vaporized or distilled from the treated recycle and, while in the gaseous state, is subjected to filtration to remove contaminants that may be carried over. Any suitable filter can be used but a preferred material is a three-dimensional crystalline aluminosilicate.

Other filter material can be used, however, such as glass wool, silica gel, diatomaceous earth, and the like. The residue remaining after monomer has been distilled off is an oily material, which comprises low molecular weight polymeric material having side chain branching and internal, as well as end-group, unsaturation.

After the monomer has been filtered, it is recondensed prior to being cycled to the polymerization reaction zone. Recondensation is suitably effected by rapidly cooling the isomer to a temperature much lower than its boiling point ($-63°$ C.).

EXAMPLE 1

The liquid recycle monomer treated in this run was a butene-1 having the composition set forth in Table I, as determined by Vapor Phase Chromatography. Into a pressure vessel were charged 2600 cc. of the recycle monomer and the vessel was heated to 74° C. The pressure was 155 p.s.i.g. Then, 3 g. of anhydrous $AlCl_3$ powder were rinsed into the vessel with 600 cc. of recycle monomer. After agitating this reaction mixture at 74° C. for 20 minutes, monomer was vaporized and gaseous butene-1 monomer was passed through a bed of 3A crystalline aluminosilicate (molecular sieve) and into a condensation vessel maintained at $-40°$ C. to liquefy the treated monomer. The treated monomer had the composition set forth in Table I.

After monomer had been removed, the pressure vessel was opened and a viscous oil (10 wt. percent of charge) containing some small solid particles was removed. Infrared analysis of this oil showed it was a low molecular weight polymeric material having side chain branching and internal and end-group unsaturation.

TABLE I

| Component | Composition of recycle, area percent | |
|---|---|---|
| | Untreated | Treated |
| Air | 0.02 | 0.03 |
| Methane | 0.01 | (¹) |
| Ethane | 0.01 | 0.01 |
| Propane | 0.07 | 0.09 |
| Propylene | 0.37 | 0.37 |
| Isobutane | 0.76 | 0.96 |
| Butane | 9.02 | 10.45 |
| Butene-1 | 85.01 | 83.70 |
| Isobutylene | 2.48 | (¹) |
| trans-Butene-2 | 2.14 | 3.50 |
| cis-Butene-2 | (¹) | 0.86 |
| 1,3-butadiene and/or methylacetylene | 0.11 | 0.03 |

¹ None detectable.

EXAMPLE 2

Comparative polymerization runs were carried out each using $TiCl_3$ and diethylaluminum chloride-diethylaluminum iodide (80:20 mole percent) catalyst system (Al:Ti ratio=3), at a temperature of 150° C. and a pressure of 120 p.s.i.g. for 3 hours. When using untreated recycle defined in Example 1, there was obtained 81 g. of polymer per g. of $TiCl_3$ per hour. When using treated recycle described in Example 1, the yield of polymer was 237 g. of polymer per g. of $TiCl_3$ per hour.

As was indicated hereinbefore, the temperature of treatment is important from the standpoint of the amount of oily polymer formed. In practice, the recycle butene-1 stream can be purified when no more than about 15 weight percent, preferably about 10 weight percent or less, of the recycle is converted to oil. Conversion to higher amounts of oily polymer constitutes a loss to the overall process.

EXAMPLES 3 THROUGH 8

A series of runs was carried out as described in Example 1, using a portion of the butene-1 recycle (untreated) defined in Example 1. In each run, 3200 g. of butene-1 recycle was used, but the amount of $AlCl_3$, the temperature, and the time of treatment were varied from run to run. Pertinent data and results for each run are set forth in Table II.

TABLE II

| Example: | G. $AlCl_3$ | Temp., °C. | Time, min. | Oil produced | |
|---|---|---|---|---|---|
| | | | | G. | Wt. percent |
| 3 | 4.0 | 46 | 30 | 350 | 20.7 |
| 4 | 5.0 | 46 | 30 | 317.5 | 18.7 |
| 5 | 5.0 | 49 | 30 | 230 | 13.6 |
| 6 | 5.0 | 74 | 30 | 169 | 10.0 |
| 1 | 3.0 | 74 | 20 | 175 | 10.3 |
| 7 | 3.0 | 74 | 10 | 131 | 8.5 |
| 8 | 5.0 | 91 | 20 | 220 | 13.1 |

From the data in Table II, it will be noted that at 46° C. (Examples 3 and 4) too large an amount of polymer oil was formed. Likewise, the amount of $AlCl_3$ used, within the range defined hereinbefore, has little effect on the amount of oil formed at a given temperature. At lower temperatures, the amount of oil formed increased and at about 20° C., as much as about 60% oil formed. At 49° C. (Example 5), the amount of oil dropped to below 15%. Below 48° C., the amount increases to 15% or more. At about 74° C. (Examples 6, 1, and 7), the amount of oil formed is about 10% and lower. However, at 91° C. (Example 8), the amount of oil formed again increased to above 10%, approaching 15%. The 15% oil formation occurred at about 93° C. Thus, the process of this invention is operated at between about 48° C. and about 93° C., preferably between about 60° C. and about 80° C.

As was mentioned hereinbefore, whatever the component in the untreated recycle that causes catalyst deactivation in subsequent polymerization, it is not, in the case of butene-1, isobutylene. As much as 25 mole percent isobutylene can be tolerated without substantial effect on catalyst activity. This will be apparent from the following examples.

EXAMPLES 9 THROUGH 12

A series of polymerization runs were carried out using the procedure, catalyst system, and conditions set forth in Example 2. In each run, however, the feed was butene-1 containing varying amounts of isobutylene. For each run, there were determined catalyst activity (g. polymer per g. $TiCl_3$ per hour), melt index (M.I.; ASTM 1238–57T), isotactic index (I.I.; wt. percent polymer insoluble in diethyl ether), and percent crystallinity. Pertinent data and results are set forth in Table III.

TABLE III

| Example: | Mole percent i-$C_5$ | Cat. activity | M.I. | I.I. | Crystallinity |
|---|---|---|---|---|---|
| 9 | 3 | 258 | 0.3 | 95.6 | 62 |
| 10 | 8 | 264 | 1.8 | 94.6 | 62.5 |
| 11 | 15 | 296 | 1.9 | 89.5 | 63 |
| 12 | 25 | 238 | 0.8 | 90.4 | 58 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the continuous process for the liquid phase polymerizing or copolymerizing a $C_4$–$C_{10}$ 1-olefin in contact with a Ziegler-Natta catalyst to form a tactic polymer and using sufficient excess liquid 1-olefin and temperature and pressure conditions to dissolve the polymer in liquid 1-olefin, wherein there is separated a 1-olefin recycle that contains impurities which deactivate a Ziegler-Natta catalyst, the method of treating said recycle to remove said impurities consisting essentially of contacting said recycle in the liquid phase with 0.01 to 1.0 weight percent of $AlCl_3$ for between 5 and 40 minutes at between 48° C. and 93° C. to obtain a treated recycle mixture, vaporizing 1-olefin monomer from said mixture and filtering, and recondensing said 1-olefin monomer as treated recycle 1-olefin.

2. The process defined in claim 1, wherein said 1-olefin is butene-1.

References Cited

UNITED STATES PATENTS

| 3,153,027 | 10/1964 | Hagemeyer et al. | 260—94.9 |
| 3,324,090 | 6/1967 | Ross et al. | 260—80.5 |

JOSEPH L. SCHOFER, Primary Examiner

S. M. LEVIN, Assistant Examiner

U.S. Cl. X.R.

260—93.7, 677

PO-1050
(5/69)

UNITED STATES PATENT OFFICE
CERTIFICATE OF CORRECTION

Patent No. 3,523,110            Dated August 4, 1970

Inventor(s) Raymond Eichenbaum

It is certified that error appears in the above-identified patent and that said Letters Patent are hereby corrected as shown below:

Column 3, line 11: "(-63°C.)" should be --(-6.3°C.)--.

Column 3, line 55: "chloridediethylaluminum" should be --chloride-diethylaluminum--.

Column 4, lines 54 and 55:
"Mole percent i-$C_5$" should be -- Mole % i-$C_4^=$ --.

SIGNED AND SEALED

OCT 27 1970

(SEAL)
Attest:

Edward M. Fletcher, Jr.
Attesting Officer

WILLIAM E. SCHUYLER, JR.
Commissioner of Patents